United States Patent [19]

Takaochi et al.

[11] Patent Number: 4,776,675

[45] Date of Patent: Oct. 11, 1988

[54] MULTICOLOR LIQUID CRYSTAL DISPLAY DEVICE HAVING PRINTED COLOR FILTERS

[75] Inventors: Minoru Takaochi; Kenichi Masaki, both of Kyoto, Japan

[73] Assignee: Nissha Printing Co., Ltd., Kyoto, Japan

[21] Appl. No.: 834,240

[22] PCT Filed: Jun. 13, 1985

[86] PCT No.: PCT/JP85/00333

§ 371 Date: Feb. 18, 1986

§ 102(e) Date: Feb. 18, 1986

[87] PCT Pub. No.: WO86/00424

PCT Pub. Date: Jan. 16, 1986

[30] Foreign Application Priority Data

Jun. 18, 1984 [JP] Japan ................. 59-126187

[51] Int. Cl.⁴ ............................................. G02F 1/13
[52] U.S. Cl. .................................. 350/339 F; 430/20
[58] Field of Search ............... 350/339 F, 334, 341, 350/320; 430/20, 5; 101/114, 212, 150, 153; 428/1, 108; 427/256

[56] References Cited

U.S. PATENT DOCUMENTS

| 4,324,815 | 4/1982 | Mitani et al. | 101/129 |
| 4,552,437 | 11/1985 | Gantenbrik et al. | 350/339 F |
| 4,593,977 | 6/1986 | Takamatsu et al. | 350/339 F |
| 4,601,546 | 7/1986 | Ohta | 350/339 F |
| 4,654,117 | 3/1987 | Aoki et al. | 350/339 R |
| 4,673,253 | 6/1987 | Tanabe et al. | 350/339 F |

FOREIGN PATENT DOCUMENTS

| 0023421 | 2/1981 | European Pat. Off. | 350/339 F |
| 0162708 | 11/1985 | European Pat. Off. | 350/334 |
| 0151134 | 8/1984 | Japan | 340/784 |
| 0003122 | 1/1986 | Japan | 430/20 |
| 0006624 | 1/1986 | Japan | 430/20 |
| 2111285 | 6/1983 | United Kingdom | 430/20 |

Primary Examiner—Stanley D. Miller
Assistant Examiner—Tai V. Duong
Attorney, Agent, or Firm—Burns, Doane, Swecker & Mathis

[57] ABSTRACT

In a multicolor liquid crystal display device, when a color filter (1) is formed above or beneath an electrode (2) by the use of a printing process, the film thickness is not uniform with indentation produced, thereby constituting a cause of the non-uniformity of orientation treatment and a defect in electroconductivity of the electrode. In this invention, the color filter (1) is formed by the use of a printing process so that the printing parameter $\alpha$ expressed by the following equation [1] is not smaller than 20 and the overlapping between the neighboring color filters is within the range of $\alpha/3 \sim (\alpha + 30)\mu$:

$$\alpha = T(\mu)/\tan\theta \qquad (1)$$

[wherein T represents the maximum film thickness of the color filter (1) and 0 represents the contract interior angle formed, relative to the substrate, by a straight line drawn so as to pass through both the position on a surface of the color filter (1) where the film thickness represents T/2, and the point of intersection between an edge of the color filter (1) and the substrate.]

14 Claims, 2 Drawing Sheets

MULTICOLOR LIQUID CRYSTAL DISPLAY DEVICE HAVING PRINTED COLOR FILTERS

FIELD OF TECHNOLOGY ASSOCIATED WITH THE INVENTION

The present invention relates to a multicolor liquid crystal display device. More specifically, it relates to a multicolor liquid crystal display device wherein pixels comprised of a substrate having color filters laid above or beneath electrodes arranged on the substrate perform a multicolor display when applied with a signal corresponding to each pixel, the color filters being formed by the use of a printing process.

BACKGROUND ART OF THE INVENTION AND TECHNICAL PROBLEM TO BE SOLVED BY THE INVENTION

Hitherto, in the multicolor liquid crystal display device, as a method for providing the color filters, it is well known to use a method comprising forming gelatin layers above or beneath the electrodes on an inner surface of the substrate and dyeing the gelatin layers to form the color filters. However, in the case of this method, there has been a problem in that both the water resistance and the heat resistance are low. In addition, in order to perform a multicolor patterning, a resist layer for anti-dyeing must be formed for each color by the use of a photolithographic process and removed subsequently, with the consequence that it must employ an increased number of process steps, thereby increasing the price of the product.

In view of the above, the inventors of the present invention had got an idea of forming the color filters by the use of a printing process and had completed the following invention with a view to solving the above discussed problems, which was applied for patent in Japan (Japanese Patent Application No. 58-119281). Namely, this invention is a color filter for a liquid crystal display device characterized in that a print layer formed with the use of an ink containing, as its primary constituent, a polyamic acid mixed with a suitably selected coloring agent or the like is formed on a glass substrate. However, continued research subsequently performed has revealed that this method has the following problems. That is, it has been found that it has a problem or the like with respect to the uniformity and the dimensional precision of the thickness of a film printed for forming the color filter and, therefore, it is difficult to make the color filter comparable with or superior to that according to the conventional method in terms of the display quality. In other words, in the case with the printing process, and when it is viewed as a total color filter, an indentation between portions where the film thickness if great and small (hereinafter referred to as "indentation") tends to be formed. In the case where the indentation is great, no orientation treatment called rubbing can be effected uniformly over the entire surface of the substrate, and therefore the display quality is adversely affected. Moreover, in the liquid crystal device of a type wherein a transparent electroconductive film is provided over the color filter, the indentation constitutes a cause of failure in electroconductivity and shortage in electroconductivity. Even if the electroconductivity is secured, in order to form a highly precise pattern, problems tend to occur at the time of masking during the subsequent patterning of the transparent electroconductive layer. In order to remove these problems, it can be contemplated to provide an overcoating layer on the surface thereby to improve the smoothness of the identation, but it is technically difficult and reduces the merits of the printing process which is low in cost.

SUMMARY

In view of the above, the inventors have found as a result of the further continued research that, when the color filter is formed by the use of the printing process, the shape thereof represents a semispheroidal or trapezoidal shape or the like, and have completed the present invention based on the finding. That is, the multicolor liquid crystal display device comprises first and second substrates; a plurality of first electrodes disposed on the first substrate; at least one second electrode disposed on the second substrate; a liquid crystal disposed between the first and second substrates with the plurality of first electrodes facing the at least one second electrode; and a plurality of printed color filters, the filters covering respective ones of the plurality of first electrodes, wherein the color filters are printed with a printing parameter $\alpha$ not smaller than 20, the printing parameter $\alpha$ being given by $$\alpha = T/\tan\theta$$

in which T is a maximum thickness of the color filters expressed in micrometers ($\mu$) and $\theta$ is a contact interior angle formed relative to the substrate by a straight line passing through a point on a surface of a color filter corresponding to T/2 and an intersection point of an edge of that color filter and the substrate, and neighboring ones of the plurality of color filters overlapping by an amount in a range of $\alpha/3$ to $\alpha+30$ micrometers.

In another embodiment, the multicolor liquid crystal display device comprises first and second substrates; a plurality of first electrodes disposed on the first substrate; at least one second electrode disposed on the second substrate; a liquid crystal disposed between the first and second substrates with the plurality of first electrodes facing the at least one second electrode; and a plurality of printed color filters, the filters being disposed between the first substrate and respective ones of the plurality of first electrodes, wherein the color filters are printed with a printing parameter $\alpha$ not smaller than 20, the printing parameter being given by $$\alpha = T/\tan\theta$$

in which T is a maximum thickness of the color filters expressed in micrometers ($\mu$) and $\theta$ is a contact interior angle formed relative to the substrate by a straight line passing through a point on a surface of a color filter corresponding to T/2 and an intersection point of an edge of that color filter and the substrate, and neighboring ones of the plurality of color filters overlapping by an amount in a range of $\alpha/3$ to $\alpha+30$ micrometers.

EFFECTS OF THE INVENTION

Since the present invention is constructed as hereinbefore described, the following effects can be obtained. That is, because of the printing process used, the color filter can be formed in a simplified manner and at a reduced cost. Important of all is that, since specific printing conditions are employed for the formation of the color filter, the surface can be smooth and, therefore, the display quality can be improved.

BRIEF DESCRIPTION OF THE DRAWINGS

Hereinafter, the present invention will be described in detail in connection with an embodiment thereof with reference to the accompanying drawings.

The FIGS. 1-3 together show one embodiment of a multicolor liquid crystal display device of the present invention in which the color filter covers the electrode, wherein

FIG. 5 is similar to FIG. 4 and shows an orientig film over the color filters. Like numerals in FIGS. 4-5 correspond to those of FIGS. 1-3.

DETAILED DESCRIPTION

Figure 1:
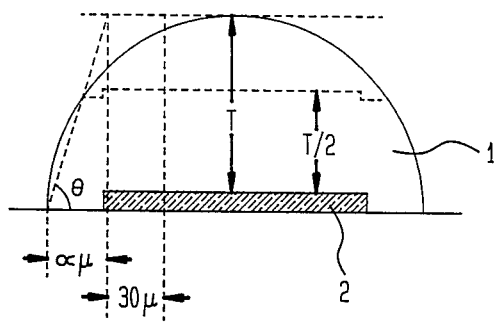
FIG. 1 is an explanatory diagram, on an enlarged scale, showing one pixel.
Figure 2:
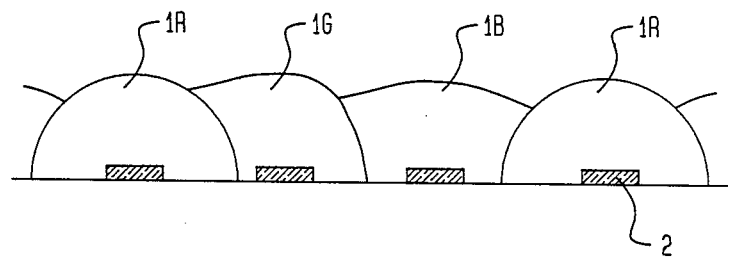
FIG. 2 is an explanatory diagram, on an enlarged scale, a plurality of pixels showing the adjoining conditions thereof.

In the drawings, 1 represents a color filter, 1R represents a red color filter, 1G represents a green color filter, and 1B represents a blue color filter. 2 represents electrodes, 3 represents orienting films, 4 represents a glass substrate, 5 represents a polarizing plate, 6 represents a back-light, and 7 represents a liquid crystal.

The reason that in the present invention, the printing parameter $\alpha$ is selected to be not smaller than 20 is as follows. If the value $\alpha$ is smaller than 20, the contact interior angle $\theta$ will become great resulting in the increased indentation. Where a method is employed to make the neighboring color filters overlap with each other in order to smooth the indentation, the range of tolerance will be extremely narrowed and the printing cannot be performed to a precision. Accordingly, even if such is theoretically possible, the fact is that the manufacture is impossible. By way of example, in the case where the value $\alpha$ is 10, in order to obtain a multicolor liquid crystal display device having a good display quality without any defect in orientation, the overlapping of the neighboring color filters must be restricted within the range of $5 \sim 10$ $\mu$. However, the presentday printing technology is still far from the achievement required to limit an error in overlapping to not greater than 5 $\mu$.

The reason that the overlapping of the neighboring color filters is limited to not smaller than $\alpha/3$ $\mu$ is as follows. If it is smaller than that, a sufficient orientation treatment cannot be achieved because of the inferior smoothness and it will constitute a cause of leakage of back light (white color light) at non-pixel areas. When it is made not smaller than $\alpha/3$ $\mu$, the indentation can be made not greater than ⅔ of the film thickenss T and, moreover, since an acute portion of the angle in the vicinity of an edge of the color filter can be eliminated, the indentation can be smoothed with minimization of the defect in orientation. In addition, even in the case where the transparent electroconductive layer is formed over the color filter, a device in electroconductivity can be eliminated and the patterning can be made easy. Preferably, by making it not smaller than $\alpha/2$ $\mu$, a defect in orientation attributable to the indentation can be eliminated.

On the other hand, the reason for the limitation to not greater than $(\alpha+30)$ $\mu$ is as follows. Although it is necessary to increase the film thickness at the pixel area rather than the non-pixel area in order to avoid the defect in orientation, an objective can be generally attained by restricting the overlapping of the neighboring color filters to the above mentioned range. If it may happen that the film thickness at the non-pixel area is greater than that at the pixel area, there will be no practical problem since, so far as falling within the above mentioned range, it is possible to limit to a very slight width. The reason therefor will now be described in detail. By selecting the value $\alpha$ to be not smaller than 20 as hereinbefore described, the necessity will arise to select a printing ink of relatively low viscosity and the shape of the ink after the printing will necessarily become smooth (see FIG. 1). Accordingly, even at a position spaced $(\alpha+30)$ $\mu$ from an edge of the ink, it is at a position lower than the maximum film thickness T ($\mu$), and it will represent a moderate portion having a small inclination. When a printed material is actually measured, the film thickness is found to be $0.8T \sim 0.9T$ ($\mu$) on an average. More preferably, by making the overlapping portion not greater than $(\alpha+10)\mu$, the smoothing can be further promoted.

Figure 3:
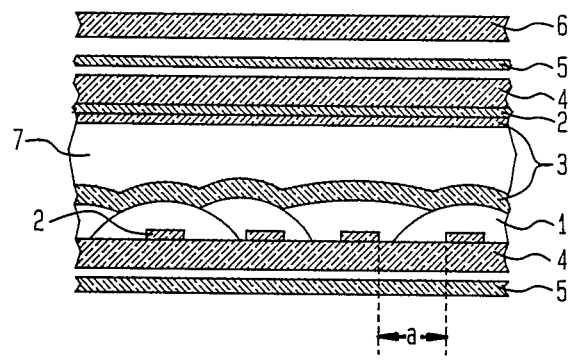
FIG. 3 is a fragmentary sectional view.
Figure 4:
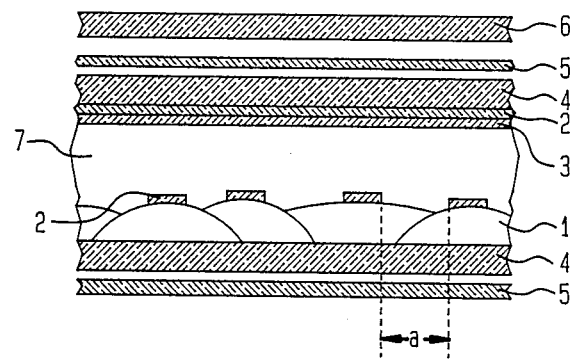
FIGS. 4-5 show a fragmentary sectional view of an embodiment of the present invention in which the color filter is provided below the electrode.
Figure 5:
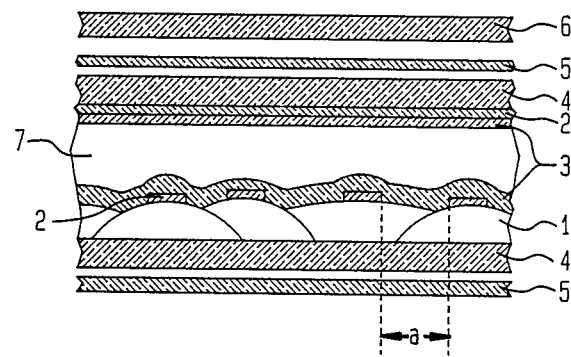

It is to be noted that, when the width of the electrode is selected to be a $\mu$, (see FIG. 3) the value $\alpha$ must be $20 \sim 2a$. A condition required for the smoothness to be maintained when $\alpha$ is 2a is such that the overlapping range is $2a/3 \sim (2a+30)\mu$. While there will be no problem in the case of $2a/3$ $\mu$, in the case of $(2a+30)\mu$, the color filter will intrude $(a+15)$ at minimum into the neighboring pixel and the two color filters overlap, making it dark. Although there will be no problem in terms of visibility if the size of the pixel is large and that portion where the two color filters overlap with each other has a surface area equal to 10% of the total surface area of the pixel, it is still preferred that there is no instrusion into the neighboring pixel. In such case, the permissible range of overlapping is $2a/3 \sim a$ $\mu$, and it must be rendered $a/3\mu$, thus narrowing the permissible range. Especially in the case of the highly precise display device, a is not greater than 50 $\mu$ and the permissible range is narrow, posing a problem during the manufacture by printing. Therefore, when $\alpha$ is not smaller than 2a, it will result in that the manufacture is in fact impossible.

In the present invention, the printing process is not always limited to a specific one. Any of a silk screen printing method, a letterpress printing method, a gravure printing method, a gravure offset printing method and other printing methods can be suitable adopted. Needless to say, consideration must be made to the viscosity of the ink appropriate to the respective printing method in order for the above mentioned requirements to be satisfied. By way of example, in the case of the silk screen printing method, $1,000 \sim 50,000$ cps is preferred; in the case of the letterpress printing method, $50 \sim 10,000$ cps is preferred; in the case of the gravure printing method, $10 \sim 5,000$ cps is preferred; and in the case of the gravure offset printing method, $10 \sim 5,000$ cps is preferred.

The type of ink employed may be one containing, as its primary constituent, a component wherein a coloring agent is mixed with or dissolved in at least one resin selected from the group consisting of polyimide type resin, acrylic type resin, polyvinyl alcohol type resin, polyester type resin, epoxy type resin, polyurethane type resin, polysulfone type resin, melamine type resin and silicone type resin. If the polyamic acid is used as a binder, the heat resistance as well as the printing adaptability can be improved. As to the coloring agent, it may be suitably selected from any dyes and pigment. As a dye, an oil-soluble dye is preferred, and examples thereof include a KAYASET system (manufactured by Nippon Kayaku Co.), an OILCOLOR system (manufactured by Orient Kagaku Co.) and an OLEOSOL system (manufactured by Sumitomo Kagaku Co.). In the case of the pigment, the use of a pigment having a small particle size and an excellent transparency can be recommendable.

The multicolor liquid crystal display device to which the present invention pertains can be applicable not only where a standard matrix substrate utilizing a glass substrate or a film substrate is employed, but also where an active matrix substrate such as, for example, a silicon substrate with switching transistor built therein, an SOS substrate or a glass substrate with thin-film transistor formed therein is employed.

As hereinbefore described, since the multicolor liquid crystal display device according to the present invention is constructed by the printing process, the color filter can be formed in a simplified manner and at a reduced cost, and most important of all is that, since the printing condition for the formation of the color filter is specified, the surface can be smoothed and, therefore, the display quality can be improved.

What is claimed is:

1. A multicolor liquid crystal display device, comprising:
   first and second substrates;
   a plurality of first electrodes disposed on the first substrate;
   at least one second electrode disposed on the second substrate;
   a liquid crystal disposed between the first and second substrates with the plurality of first electrodes facing the at least one second electrode; and
   a plurality of printed color filters, the filters covering respective ones of the plurality of first electrodes, wherein the color filters are formed by a printing process with a printing parameter $\alpha$ not smaller than 20, the printing parameter $\alpha$ being given by $$\alpha = T/\tan\theta$$

in which T is a maximum thickness of the color filters expressed in micrometers ($\mu$) and $\theta$ is a contact interior angle formed relative to the substrate by a straight line passing through a point on a surface of a color filter corresponding to T/2 and an intersection point of an edge of that color filter and the substrate, and neighboring ones of the plurality of color filters overlapping by an amount in a range of $\alpha/3$ to $\alpha+30$ micrometers.

2. The multicolor liquid crystal display device as defined in claim 1, wherein, when the width between the plurality of first electrodes is A micrometers ($\mu$), said $\alpha$ is in a range of 20 $\mu$ to 2A $\mu$.

3. The multicolor liquid crystal display device as defined in claim 1, wherein a printing ink is one containing, as its primary constituent, a component wherein a coloring agent is mixed with or dissolved in at least one resin selected from the group consisting of polyimide type resin, acrylic type resin, polyvinyl alcohol type resin, polyester type resin, epoxy type resin, polyurethane type resin, polysulfone type resin, melamine type resin and silicone type resin.

4. The multicolor liquid crystal display device as defined in claim 1, wherein the printing process is a silk screen printing method and wherein the viscosity of an ink is 1,000~50,000 cps.

5. The multicolor liquid crystal display device as defined in claim 1, wherein the printing process is a letterpress printing method and wherein the viscosity of an ink is 50~10,000 cps.

6. The multicolor liquid crystal display device as defined in claim 1, wherein the printing process is a gravure printing method and wherein the viscosity of an ink is 10~5,000 cps.

7. The multicolor liquid crystal display device as defined in claim 1, wherein the printing process is a gravure offset printing method and wherein the viscosity of an ink is 10~5,000 cps.

8. A multicolor liquid crystal display device comprising:
   first and second substrates;
   a plurality of first electrodes disposed on the first substrate;
   at least one second electrode disposed on the second substrate;
   a liquid crystal disposed between the first and second substrates with first electrodes facing the at least one second electrode;
   a plurality of printed color filters, the filters being disposed between the first substrate and respective ones of the plurality of first electrodes, wherein the color filters are formed by a printing process with a printing parameter $\alpha$ not smaller than 20, the printing parameter $\alpha$ being given by $$\alpha = T/\tan\theta$$

in which T is a maximum thickness of the color filters expressed in micrometers ($\mu$) and $\theta$ is a contact interior angle formed relative to the substrate by a straight line passing through a point on a surface of a color filter corresponding to T/2 and an intersection point of an edge of that color filter and the substrate, and neighboring ones of the plurality of color filters overlapping by an amount in a range of $\alpha/3$ to $\alpha+30$ micrometers.

9. The multicolor liquid crystal display device as defined in claim 8, wherein, when the width between the plurality of first electrodes is A micrometers ($\mu$), said $\alpha$ is in a range of 20 $\mu$ to 2A $\mu$.

10. The multicolor liquid crystal display device as defined in claim 8, wherein a printing ink is one containing, as its primary constituent, a component wherein a coloring agent is mixed with or dissolved in at least one resin selected from the group consisting of polyimide type resin, acrylic type resin, polyvinyl alcohol type resin, polyester type resin, epoxy type resin, polyurethane type resin, polysulfone type resin, melamine type resin and silicone type resin.

11. The multicolor liquid crystal display device as defined in claim 8, wherein the printing process is a silk screen printing method and wherein the viscosity of an ink is 1,000~50,000 cps.

12. The multicolor liquid crystal display device as defined in claim 8, wherein the printing process is a letterpress printing method and wherein the viscosity of an ink is 50~10,000 cps.

13. The multicolor liquid crystal display device as defined in claim 8, wherein the printing process is a gravure printing method and wherein the viscosity of an ink is 10~5,000 cps.

14. The multicolor liquid crystal display device as defined in claim 8, wherein the printing process is a gravure offset printing method and wherein the viscosity of an ink is 10~5,000cps.

* * * * *